D. W. KEYES.
DRIVE GEARING FOR TRACTION ENGINES.
APPLICATION FILED MAR. 18, 1908.

928,458.

Patented July 20, 1909.

Witnesses:
Q. A. Olson
P. J. McAllister

Inventor:
Darwin W. Keyes
by
Joshua R. H. Potts.
Att'y.

UNITED STATES PATENT OFFICE.

DARWIN W. KEYES, OF HENRY, SOUTH DAKOTA.

DRIVE-GEARING FOR TRACTION-ENGINES.

No. 928,458.    Specification of Letters Patent.    Patented July 20, 1909.

Application filed March 18, 1908. Serial No. 421,846.

*To all whom it may concern:*

Be it known that I, DARWIN W. KEYES, a citizen of the United States, residing at Henry, county of Codington, and State of South Dakota, have invented certain new and useful Improvements in Drive-Gearing for Traction-Engines, of which the following is a specification.

My invention relates to traction engines and particularly to the drive gear for traction engines.

The object of my invention is to provide a drive wheel for traction engines which shall have a broad tread and so arranged that the power will be applied thereto at substantially the center of the rim or tread.

A further object of my invention is to provide a differential drive mechanism for traction engines which shall be of simple construction, and one which will not readily get out of order.

Other objects will appear hereinafter.

With these objects in view my invention consists generally in a power driven drive shaft having a pair of sprocket gears loosely mounted thereon, a pair of drive wheels operably connected to said sprocket gears, ratchet clutches for coupling said gears to the drive shaft and means for yieldingly holding the clutch members in contact.

My invention further consists in a power driven drive shaft having a pair of gears loosely mounted thereon, a pair of drive wheels operably connected to said gears, a pair of ratchet clutches for each of said gears, one clutch being used in driving the machine forwardly and the other for reversing the same, and means for shifting said gears into engagement with one or the other of said engagement with one or the other of said clutches and for holding the same in yielding engagement therewith.

My invention further consists in a traction engine having a power driven drive shaft, a pair of gears mounted thereon and a pair of drive wheels having broad treads or rims and means for operably connecting said gears to said wheels at substantially the center of the rims, to the end that the power shall be transmitted equally to both edges of the rim.

My invention further consists in various details of construction and arrangements of parts all as will be hereafter fully described and particularly pointed out in the claim.

Figure 1:
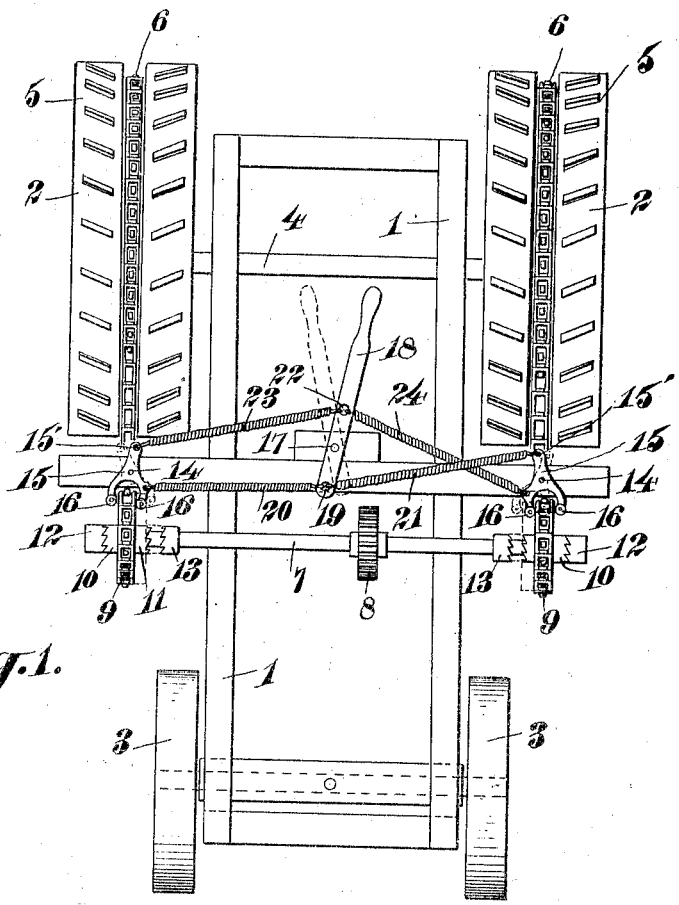
Figure 2:
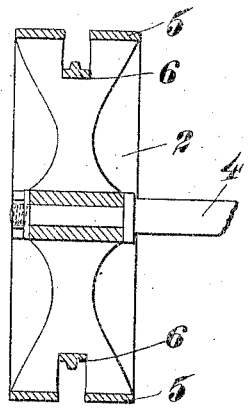

My invention will be more readily understood by reference to the accompanying drawings forming a part of this specification, and in which, Figure 1 is a diagrammatic plan view of the under frame of a traction engine equipped with a drive gear embodying my invention in its preferred form, and Fig. 2 is a detail sectional view of one of the drive wheels.

Referring to the drawings 1 indicates conventionally the underframe of a traction engine supported upon the drive wheels 2 and the front or steering wheels 3. The drive wheels 2 are mounted upon the usual axle or shaft 4 and are of a peculiar and novel construction. The drive wheels for traction engines which are intended for heavy draft purposes must be very broad, that is, provided with broad treads or rims. Heretofore, so far as I am aware, the drive gear for each drive wheel is connected to one side thereof. This, for heavy work is undesirable, especially when the treads of the wheel are very broad as it causes undue strain on the axle or shaft and not infrequently bends the same. In carrying out my invention I connect the power centrally of each rim and in this way dispense with the strain on the axle tending to bend the same.

5 indicates the rim of the wheel which is provided with a gear portion 6 arranged centrally of its periphery. In order to prevent the gear from becoming clogged with mud or dirt I depress it somewhat below the outer face of the rim. The gear portion 6 may be the ordinary spur gear but I prefer a sprocket gear and have so illustrated it in the drawings. In making turns, one drive will turn faster or in advance of the other, hence a suitable differential drive mechanism must be provided for.

7 indicates the drive shaft which is driven from the engine through the gear 8. The shaft 7 extends transversely of the machine and is provided with the sprocket gears 9—9 which are substantially in alinement with the gear portion 6 of the drive wheels. The gears 9 are loosely mounted on the shaft and are coupled thereto by ratchet clutches.

In order that the device may be driven either forwardly or backwardly two clutches are provided for each of the gears 9, one of which is operable to drive the wheel 2 in one direction and the other to drive it in the opposite direction. To this end each gear is provided with a ratchet clutch member 10 upon its outer face and a similar ratchet member 11 on its inner face which coöperate with clutch members 12 and 13 respectively, fixed to the shaft 7. The clutches 10—12 and 11—13 are similar with the exception that when the former is in clutched position the machine may be driven forwardly, whereas when the latter are in engagement the machine can only be driven backwardly. The clutch members 12 and 13 are so positioned or spaced apart on the shaft that the clutch members on the gear can engage with only one at a time, and suitable means are provided for shifting the gear from one to the other as desired, and to hold it in yielding engagement therewith. Pivotally mounted as at 14 adjacent to each gear 9 is a forked lever 15, the bifurcated ends of which are provided with the rollers 16 which bear against the opposite faces of the gear 9. Pivotally mounted as at 17 is the operating lever 18 which may be actuated in any suitable manner. To the end 19 of the lever are connected a pair of stout springs 20 and 21, the former being connected to the bifurcated end of one of the levers 15 and the other (21) being attached to the opposite end 15' of the other lever. Secured to the lever 18 as at 22 are a similar pair of springs 23 and 24, the spring 23 being secured to the end 15' of the lever to which the spring 20 is attached and the spring 24 to the bifurcated end of the opposite lever.

It should be noted that the points 19 and 22 at which the springs are attached to the lever 18 are at substantially equal distances on opposite sides of the pivot pin 17. By throwing the lever to the position shown in full lines, the springs 23 and 21 will throw the clutch members 10 into engagement with the clutch members 12, and hold them in yielding engagement therewith. When in this position the machine may be driven forwardly. However in making a turn the outer drive wheel 2 is free to turn more rapidly than the inner one, the ratchet clutch permitting its respective gear 9 to turn in advance of the other. By throwing the lever 18 into the position shown in dotted lines, the machine may be reversed or driven backwardly, the springs 20 and 24 serving to throw the clutch members 11 into engagement with the clutch members 13 and holding them in yielding engagement therewith.

Having described my invention what I claim is new and desire to secure by Letters Patent, is:

In a traction engine, a power driven drive shaft and a pair of drive wheels in combination with a pair of gears mounted on said shaft in alinement with said drive wheels and operably connected thereto, oppositely operating ratchet clutch members upon the opposite sides of each of said gears, coöperating clutch members on said shafts on each side of said gears respectively, said members being fixed to the shaft and said gears being loosely and slidably mounted thereon a short bifurcated lever pivotally mounted adjacent to each of said gears for throwing the same and their clutch members, an operating lever pivotally mounted between said bifurcated levers and a plurality of springs connecting said operating lever with said bifurcated levers so that movement of the former in one direction will operate the latter to throw their respective gears inwardly and movement in the opposite direction will throw said gears outwardly and hold the respective clutch members in yielding engagement, substantially as described.

In testimony whereof I have signed my name to this specification in the presence of two subscribing witnesses.

DARWIN W. KEYES.

Witnesses:
HELEN F. LILLIS,
HOWARD S. AUSTIN.